(12) United States Patent
Haley et al.

(10) Patent No.: US 6,890,251 B2
(45) Date of Patent: May 10, 2005

(54) APPARATUS AND METHOD FOR REMOVING POULTRY TENDERS

(75) Inventors: Brandon Casey Haley, Springdale, AR (US); William David Royall, Springdale, AR (US); Richard Passmore, Taylorsville, NC (US); Kip Edwards, Hilliard, FL (US); Marion Parker Davis, Jacksonville, FL (US)

(73) Assignee: Tyson Foods, Inc., Springdale, AR (US)

( * ) Notice: Subject to any disclaimer, the term of this patent is extended or adjusted under 35 U.S.C. 154(b) by 146 days.

(21) Appl. No.: 10/271,395

(22) Filed: Oct. 15, 2002

(65) Prior Publication Data

US 2004/0072526 A1 Apr. 15, 2004

(Under 37 CFR 1.47)

(51) Int. Cl.[7] ................................................. A22C 18/00
(52) U.S. Cl. ....................................................... 452/149
(58) Field of Search ................................ 452/149, 152, 452/153, 155, 166, 167

(56) References Cited

U.S. PATENT DOCUMENTS

| | | | | |
|---|---|---|---|---|
| 4,503,587 A | * | 3/1985 | Martin | 452/169 |
| 4,562,613 A | * | 1/1986 | Lewis | 452/160 |
| 4,564,976 A | * | 1/1986 | Beech et al. | 452/160 |
| 4,597,136 A | * | 7/1986 | Hazenbroek | 452/169 |
| 4,639,975 A | * | 2/1987 | van der Eerden | 452/167 |
| 4,651,383 A | * | 3/1987 | van der Eerden | 452/169 |
| 5,176,564 A | * | 1/1993 | Hazenbroek | 452/169 |
| 5,188,560 A | * | 2/1993 | Hazenbroek | 452/169 |
| 5,194,035 A | * | 3/1993 | Dillard | 452/165 |
| 5,374,214 A | | 12/1994 | Martin et al. | |
| 5,429,549 A | * | 7/1995 | Verrijp et al. | 452/169 |
| 5,460,567 A | * | 10/1995 | Tieleman et al. | 452/167 |
| 5,466,185 A | | 11/1995 | Martin et al. | |
| 5,562,532 A | | 10/1996 | Horst et al. | |
| 5,833,527 A | * | 11/1998 | Hazenbroek et al. | 452/170 |
| 6,319,110 B1 | * | 11/2001 | Peters et al. | 452/149 |

* cited by examiner

*Primary Examiner*—Thomas Price
(74) *Attorney, Agent, or Firm*—Blackwell Sanders Peper Martin LLP; Mark E. Stallion

(57) ABSTRACT

An apparatus and method for removing poultry tenders from at least partial poultry carcasses. The apparatus and method preferably employ an elongate pair of stationary blades through which the carcasses are conducted prior to being processed by at least a pair of plows positioned on apposite sides of the keels of the carcasses. The edges of the elongate blades are spaced apart and inclined such that the blade edges receive the keels therebetween and guide the carcasses in their path of travel while cutting into the carcasses along each side of the keels.

31 Claims, 18 Drawing Sheets

APPARATUS AND METHOD FOR REMOVING POULTRY TENDERS

FIELD OF THE INVENTION

The present invention relates to apparatuses and methods for removing poultry breast tenders from poultry carcasses. In one aspect, the present invention relates to improvements to prior apparatuses and methods involving the use of rotatable plows.

BACKGROUND OF THE INVENTION

Chicken breast tenders are presently one of the fastest growing products in the food services market. It is estimated that tender sales have increased by about 67% over the past four years. Such growth will likely continue.

A need presently exists for a continuous, in-line system for significantly increasing the percentage production of "A-grade" tender products. To qualify as an A-grade tender, the product must be substantially free of defects. A-grade tenders thus constitute the highest quality, most desirable product. Unfortunately, the maximum A-grade production provided by most tender removal devices heretofore used in the art has commonly been only about 30%.

An example of one type of tender removal device commonly used in the art is the FoodCraft in-line breast debone machine (ILBD). The FoodCraft ILBD machine comprises: an elongate front pair of horizontal keel guides or rails; an elongate rear pair of horizontal keel guides positioned behind and in line with the front guides; a front pair of spring loaded, freely rotatable, circular plows positioned on opposite lateral sides of the horizontal keel guides; and a trailing pair of spring loaded, freely rotatable, circular plows located on opposite sides of the keel guides downstream of the front plows.

As will be understood, by those skilled in the art, the FoodCraft ILBD device operates to assist in removing the breast tenders from each side of the front (breast) half portion of the poultry carcass. Prior to being delivered to the plows, the front half will typically have been separated from the back half (i.e., the saddle) of the carcass and the wings and the outer portions of the breasts will also have been removed. The tenders will preferably also have been underscored by a pair of knives located upstream of the plows.

The "fronts" will typically be carried through the ILBD device on a cone-type conveyor or similar apparatus such that the keel and the two tender portions of each front are facing upward and the shoulder and neck portions of the fronts are leading into the direction of the travel. The cone-type conveyor thus continuously carries the fronts beneath and into the ILBD such that the keel portions of the fronts are received between the keel guides. The keel guides are elongate rail-type structures which simply operate to capture the upper keel portions of the fronts and thereby orient and guide the fronts into and through the ILBD plows The front plows of the ILBD device will typically be circular blades oriented to cut through each side of the wishbone, sever the membrane (i.e., the tender membrane) covering the outer surface of the tender, and cut the tender meat away from the keel. The trailing plows of the ILBD device typically are not sharpened and do not act to cut into the fronts. Rather, the trailing plows are oriented to follow in the path of the cutting plows such that the trailing plows operate to peel the tenders away from the fronts and provide sufficient separation to allow the tenders to be easily pulled from the fronts by hand or by conventional mechanical means.

In one modification of the ILBD system attempted heretofore, a downwardly extending pivoting blade has been positioned upstream of the ILBD plows. The modified system has provided some increase in A-grade yield. However, further significant increases in A-grade yield are needed.

SUMMARY OF THE INVENTION

The present invention satisfies the needs and alleviates the problems discussed hereinabove. Using the inventive system, the percentage of tenders produced meeting A-grade specifications can be increased to over 65%. Moreover, this increase in A-grade production can be achieved without any reduction in overall yield.

The present invention provides an improvement to a prior apparatus for removing poultry breast tenders from at least partial poultry carcasses and more specifically from the breast frame bone having a keel bone extending centrally end to end. Guides are used to capture the keel bone and position the breast frame bone for cutting operations. As discussed above, the prior apparatus typically has at least one pair of rotatable plows positioned to be on opposite sides of the keels of the at least partial poultry carcasses as the at least partial carcasses are conducted in a path of travel through the apparatus. In one aspect, the present invention provides an improvement to the apparatus comprising a pair of blades having elongate blade edges and having an operating position upstream of the plows. The elongate blade edges are fixed in a stationary, opposing, spaced apart orientation effective for receiving the keels therebetween and guiding the at least partial poultry carcasses along the path of travel while cutting into the at least partial poultry carcasses along each side of the keels. The blades make a vertically downward cut on either side of the keel. The blades sever away the tender at the upper end of the tender adjacent the keel.

In another aspect, the inventive improvement to the apparatus comprises a pair of blades having elongate blades having an operating position upstream of the plows wherein the elongate blade edges are spaced apart and are downwardly inclined in the path of travel at an angle in the range of from about 5° to about 20°.

In yet another aspect, the present invention provides an improvement to a prior method for removing poultry breasts tenders wherein the method used heretofore has included the step of plowing the poultry breast tenders by conducting at least partial poultry carcasses having the poultry breast tenders thereon in a path of travel through at least a pair of rotatable plows positioned on opposite sides of the keels of the at least partial carcasses. The inventive improvement comprises the step, prior to the step of plowing, of precutting the at least partial poultry carcasses by conducting the at least partial poultry carcasses through a pair of stationary blades having elongate blades edges spaced apart and downwardly inclined in the path of travel at an angle of not more than 20° such that the blade edges receive the keels therebetween and guide the at least partial poultry carcasses in the path of travel. At the same time, the blade edges cut into the at least partial poultry carcasses along each side of the keels.

In yet another aspect, the present invention provides a pair of spring loaded pivoting knife assemblies proximately spaced apart to receive a keel therebetween for cutting away the tender from either side of the keel preferably employed upstream of a plow assembly and preferably trailing or downstream an elongate knife assembly for finishing the vertical cutting operation on either side of the keel.

In yet another aspect, the present invention provides an underscore assembly having a pair of spring biased and cylinder actuated underscoring blades that are proximately spaced apart to receive that keel there between, which are operable to underscore the tender on either side of the keel. The underscore blades on either side of the keel cuts or laterally underscores the tender on the opposing side of the tender from the keel. The biasing spring urges the blades inward to engage the tender and the cylinders are used to retract and release the blades at the correct point avoiding cutting other bone structures. The cylinders are operable to be electronically controlled. This apparatus reduces bone counts in tenders.

Further objects, features, and advantages of the present invention will be apparent to those skilled in the art upon examining the accompanying drawings and upon reading the following description of the preferred embodiments.

DETAILED DESCRIPTION OF THE PREFERRED EMBODIMENTS

Figure 1A:
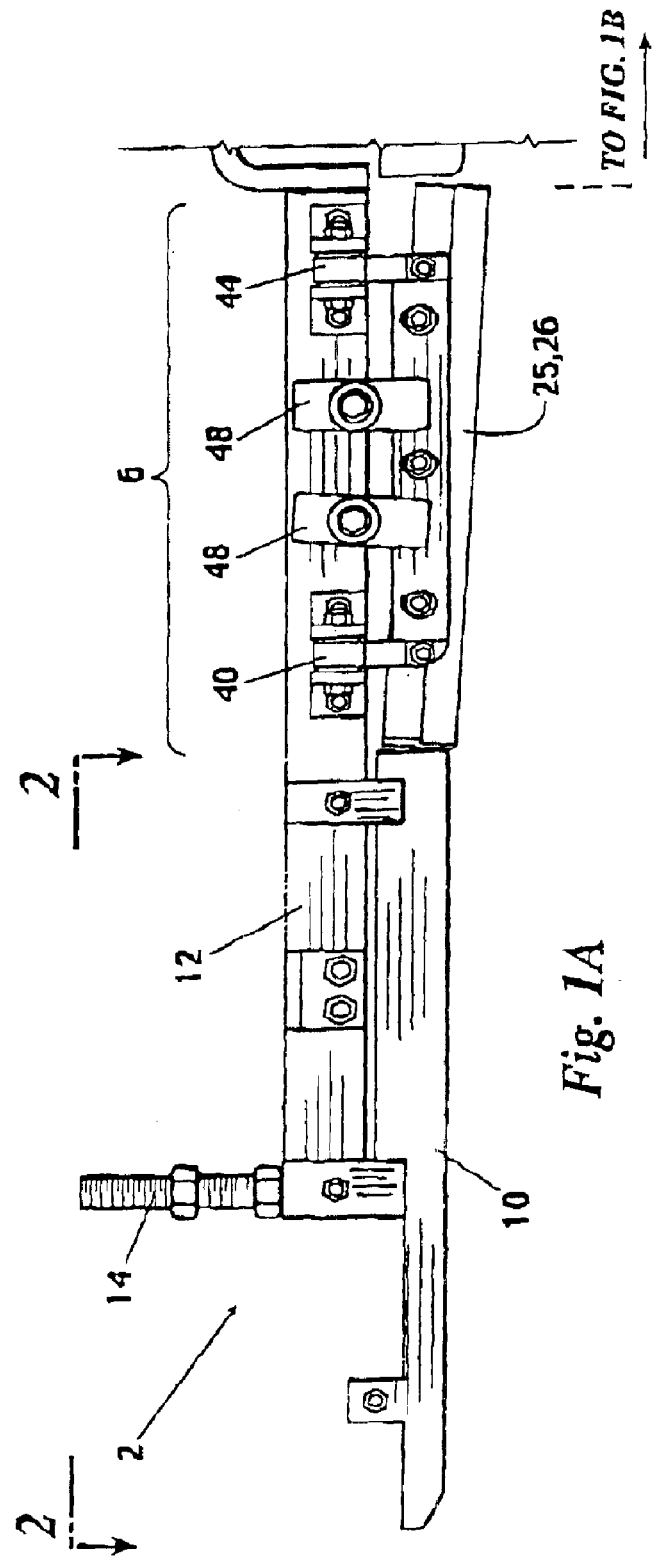
FIGS. 1A and 1B provide an elevational side view of an embodiment 2 of the inventive tender removing apparatus.
Figure 1B:
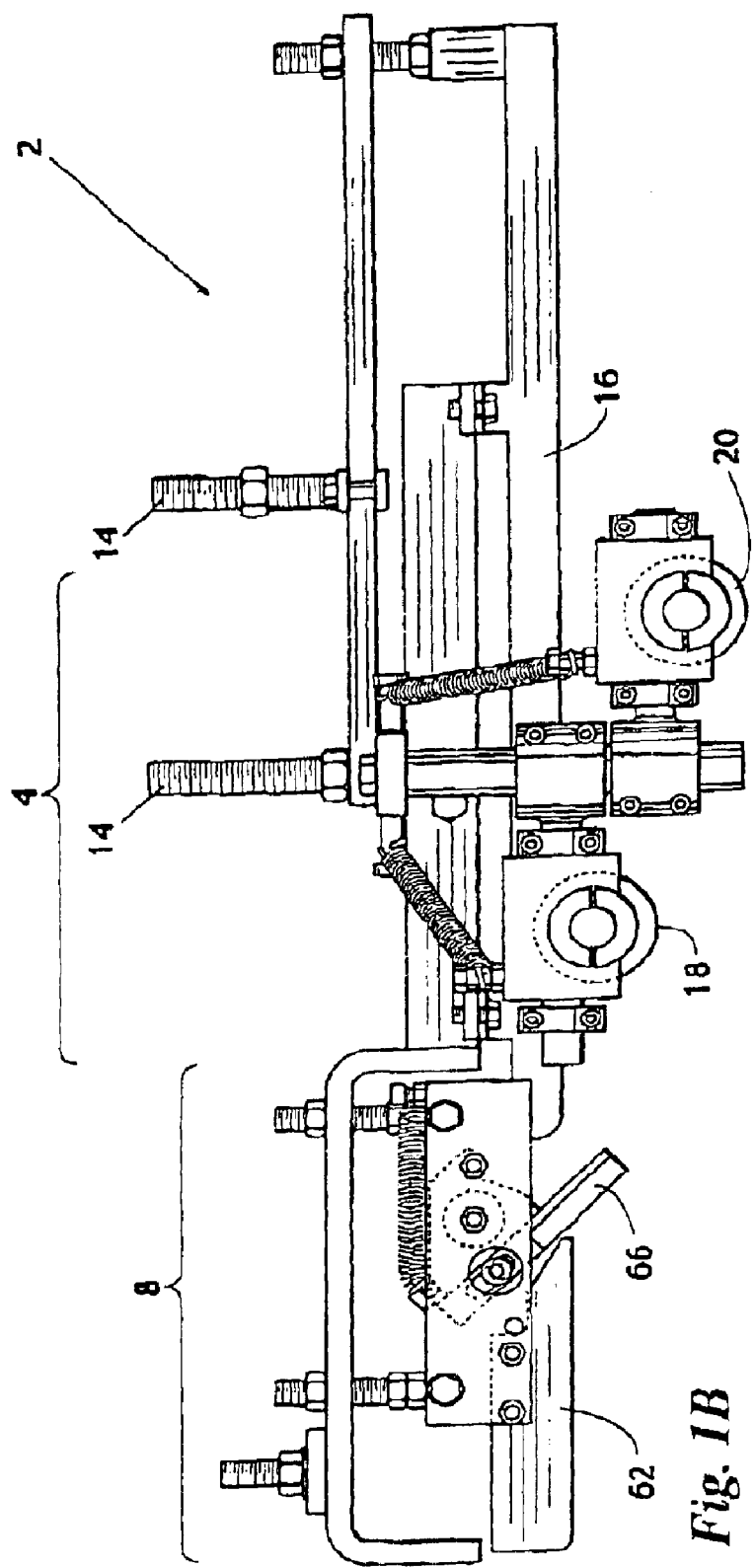

An embodiment 2 of the inventive apparatus is depicted in FIGS. 1A and 1B. Inventive apparatus 2 preferably comprises: a plow assembly 4 of the type used heretofore for removing poultry breast tenders; an elongate knife assembly 6 positioned upstream of plow assembly 4; a pivoting knife assembly 8 positioned between elongate knife 6 and plow assembly 4; and a pair of entry guides As shown in FIG. 1A, these components are preferably attached to and suspended from an elongate horizontal main frame 12. Bolts 14 or other attachment members are preferably provided on main frame 12 for securing inventive apparatus 2 in a processing line so that the entire apparatus is suspended over a conventional cone type conveyor (not shown) or other system capable of continuously conveying and supporting the poultry fronts beneath the inventive tender-removing apparatus 2.

Figure 15:
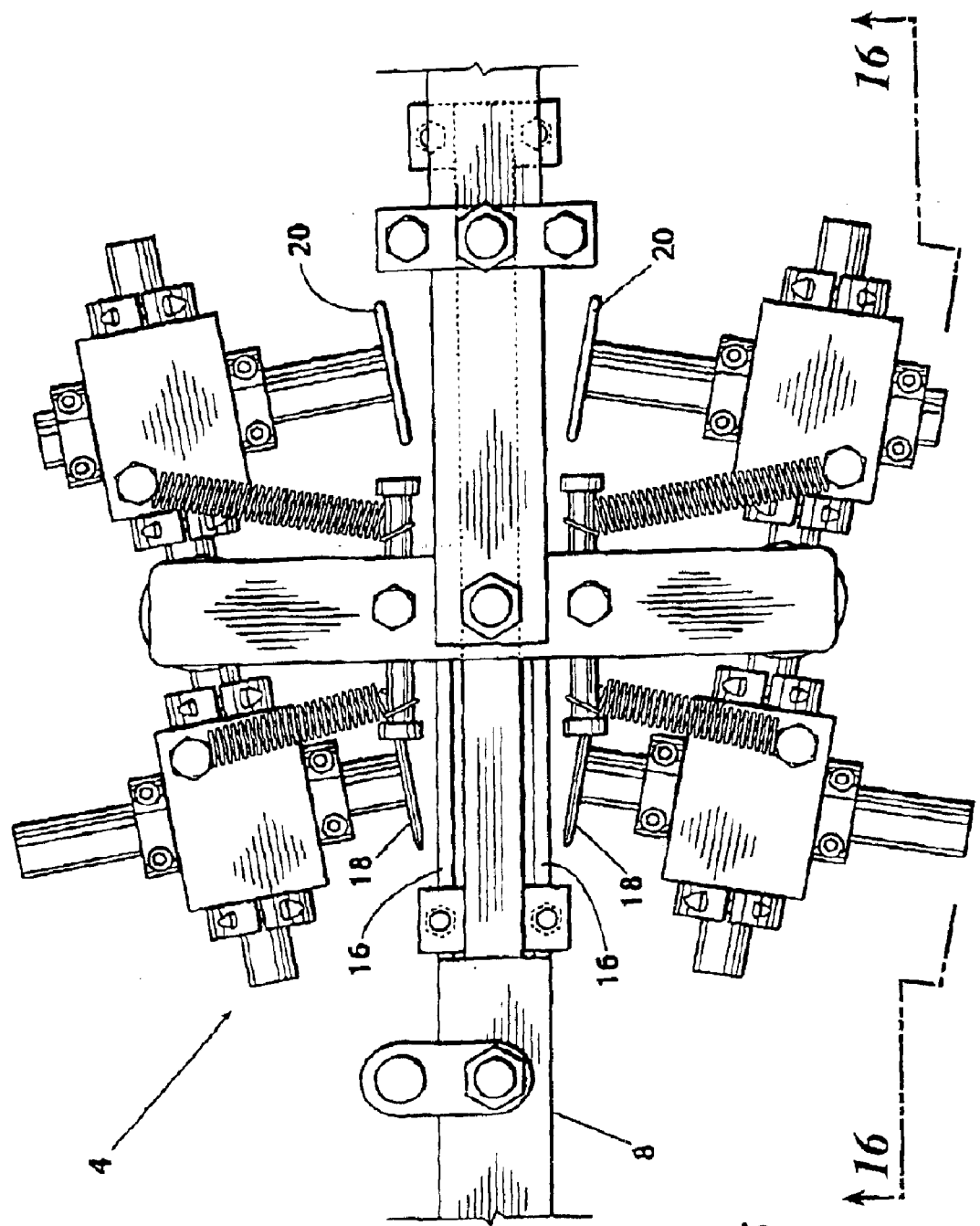
FIG. 15 provides a plan view of a plow assembly 4 employed in inventive apparatus 2.
Figure 16:
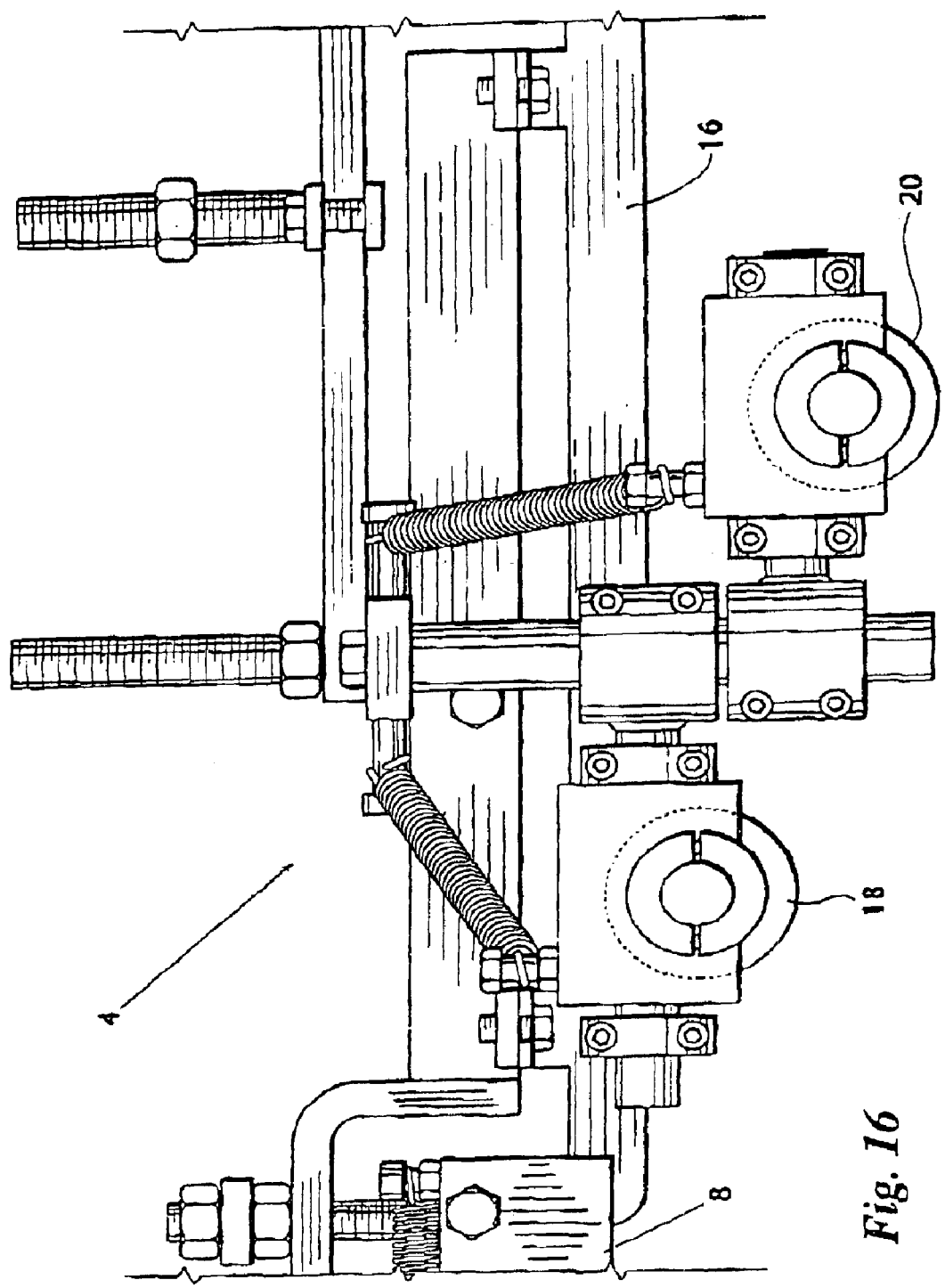
FIG. 16 provides an elevational side view of plow assembly 4.

An example of a conventional plow assembly 4 of a type particularly well suited for use in inventive apparatus 2 is depicted in FIGS. 15 and 16. Plow assembly 4 preferably comprises horizontal, side-by-side keel guides 16 and at least one pair of opposing circular plows 18 positioned on opposite sides of keel guides 16. The circular plows 18 will preferably be free rotating and spring loaded such that plows 18 will rotate with the poultry fronts as the fronts pass beneath the plows and the plows 18 will pivot up and down as necessary to adapt to and follow the varying contours, shapes, and sizes of the poultry fronts.

As will be apparent to those skilled in the art, the particular plow assembly 4 depicted in FIGS. 15 and 16 is a conventional ILBD device of the type described hereinabove having two pairs of opposing circular plows. The leading plows 18 are preferably circular blades which will complete the tender cutting process. The trailing plows 20 will preferably be non-sharpened circular disks which are positioned and oriented to follow the same path as leading plows 18 in a manner effective for peeling the tenders away from the front halves so that they can be easily pulled from the fronts by hand or by an automated pulling device.

Figure 2:
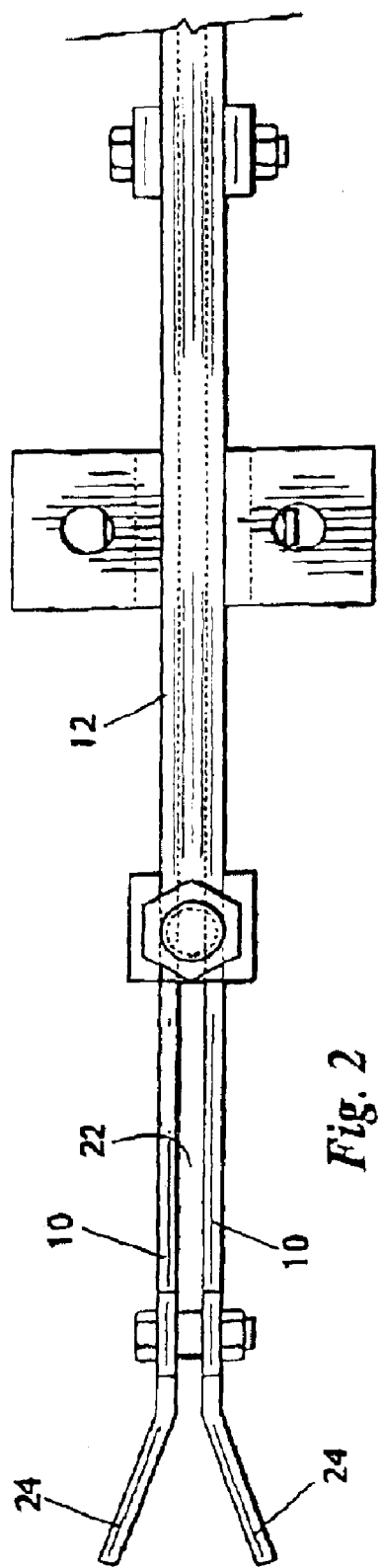
FIG. 2 provides a top view of an entry guide 10 included in inventive apparatus 2.

As depicted in FIGS. 1 and 2, the entry guides 10 employed in inventive apparatus 2 are preferably a pair of horizontal, side-by-side rails having a gap 22 therebetween. Gap 22 is sized for slidably receiving the keels of the poultry fronts to thus guide and properly orient the fronts as they are conveyed beneath inventive apparatus 2. The forward ends 24 of guides 10 are outwardly angled to assist in directing the keels into gap 22.

As will also be apparent to those skilled in the art, the particular entry guides 10 employed in embodiment 2 of the inventive apparatus are of a conventional type commonly used on ILBD machines. The difference being that, in inventive apparatus 2, an elongate knife assembly 6, and preferably also a pivoting knife assembly 8, is/are positioned between the entry guides 10 and the plow assembly 4.

In an alternative embodiment of the inventive apparatus, the elongate knife assembly 6 employed in preferred embodiment 2 can be replaced or supplemented by sharpening the bottom edges of entry guides 10 along at least a portion of the length thereof so that entry guides 10 operate to both guide and pre-cut the poultry halves. In such alternative embodiment, the entry guides 10, or at least elongate segments thereof, can optionally be inclined (in the same manner as the blades of elongate knife assembly 6 discussed hereinbelow) to further assist in the pre-cutting operation.

Figure 17:
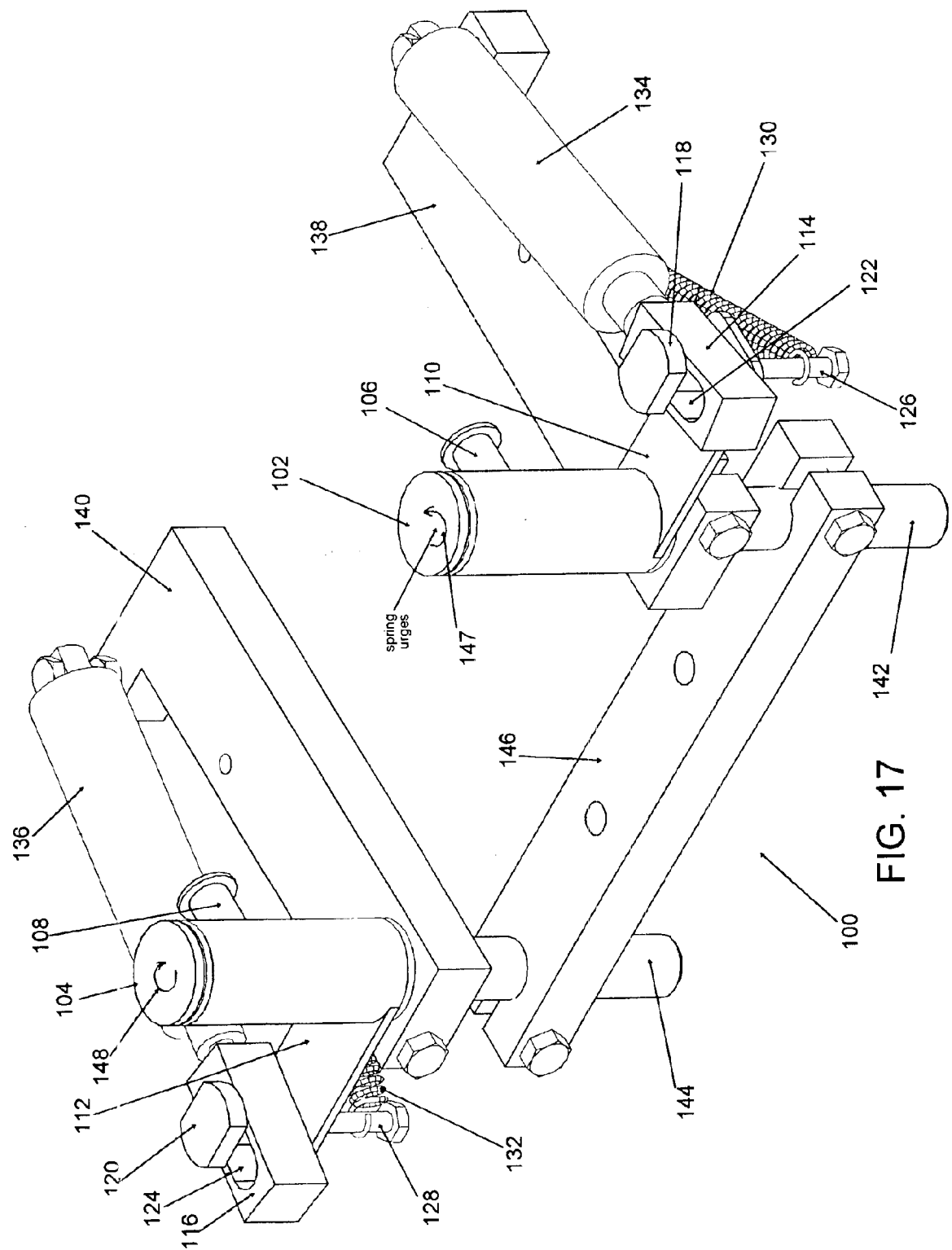
FIG. 17 provides an isometric view of an underscore assembly.
Figure 18:
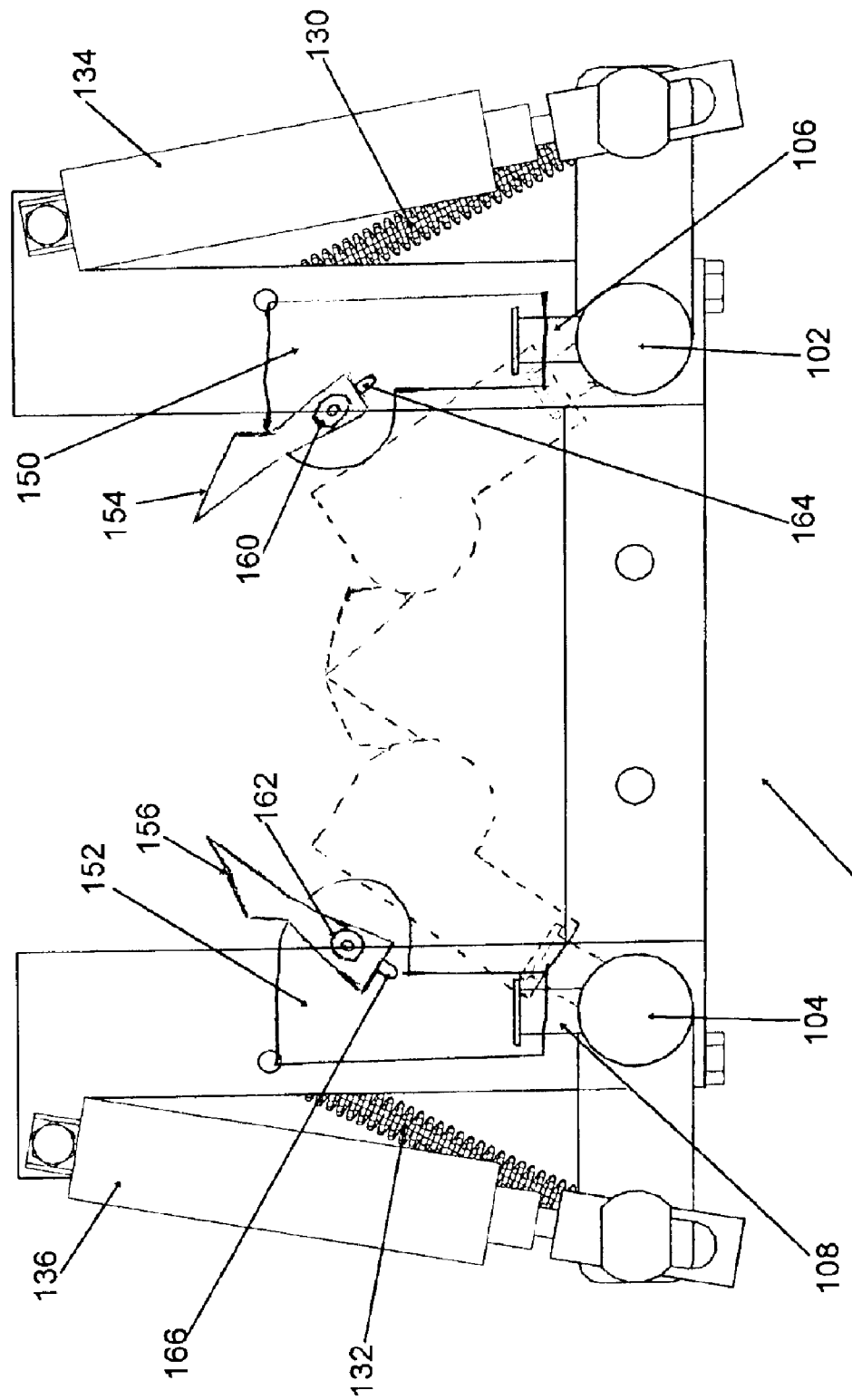
FIG. 18 provides a plane view of an underscore assembly.

In yet another alternative embodiment of the inventive apparatus, an underscore assembly 100 as seen in FIG. 17 can be positioned upstream of the elongate knife assembly 6 and downstream of the entry guides 10. The underscore assembly 100 can also be positioned along the length of the entry guides 10 to assure appropriate alignment of the keel of the partial carcass. The underscore assembly 100 as seen in FIG. 17 is designed to underscore the tender to make a longitudinal incision along the underside of the tender with blades whose cutting edge is substantially horizontally and laterally oriented with respect to the tender. FIG. 17 shows an isometric view of the underscore assembly. The underscore assembly is shown with the two pivot mounts 102 and 104 pointed upward for clarity. However, during actual operation, the underscore assembly 100 is oriented such that the pivot mounts 102 and 104 are pointed downward and positioned above the poultry front as they are conveyed past the inventive apparatus. The pivot mounts 102 and 104 each have a blade assembly mount 106 and 108 respectively. The blade assembly is not shown here however it is shown in FIG. 18 and is discussed below.

Each of the pivot mounts 102 and 104 also have pivot arms 110 and 112 respectively extending therefrom. Each of the pivot arms 110 and 112 are attached to cylinder pivot connection members 114 and 116 respectively by pivot connection pins 118 and 120. The mount between the pivot arms and the cylinder pivot connection members is slidably adjustable along slots 122 and 124. The lower end of the pivot connection pins 126 and 128 are connected to bias springs 130 and 132. The bias springs 130 and 132 effect an inward rotational bias of the pivot mounts as indicated by arrows 147 and 148. The inward bias assures that the blade edge adequately engages and underscores the tender as it is conveyed passed the blade.

The cylinder pivot connection members 114 and 116 are attached to the piston shaft of cylinders 134 and 136 respectively. Cylinders 134 and 136 are mounted to the cylinder mount blocks 138 and 140.

The cylinders 134 and 136 are operable to extend their piston shafts to effect an outward rotation of the pivot mounts 102 and 104 opposite arrows 147 and 148 in order to disengage the blade creating an inward rotational potential in the bias spring. The cylinders 134 and 136 are controllable to effect this outward rotation of the pivot mounts such that the blade assembly can be retracted outward and away from the approaching poultry fronts. The cylinders 134 and 136 are further operable to retract the piston shaft thereby allowing the bias springs 130 and 132 to release its potential to rotate the pivot mounts inwardly thereby adequately engaging the blades to underscore the tender. The cylinder mount blocks are further attached to a base mount 146.

FIG. 18 shows a plain view of the underscore assembly 100. The underscore blade assemblies 150 and 152 are shown mounted on the pivot blade mounts 106 and 108 respectively. The underscore blade assemblies 150 and 152 extend horizontally outward from the pivot mounts 102 and 104. The underscore blades 154 and 156 are adjustably mounted to the blade assemblies by adjustable mounts 160 and 162. The position of the underscore blades are slideably adjustable along slots 164 and 166. The inward rotation position of the blade assemblies 152 and 150 are shown by shadow segmented lines to illustrate the engaged position of the blades as effected by the bias springs 130 and 132. The blade assemblies 150 and 156 are shown in their retracted position as effected by cylinders 134 and 136.

Figure 19:
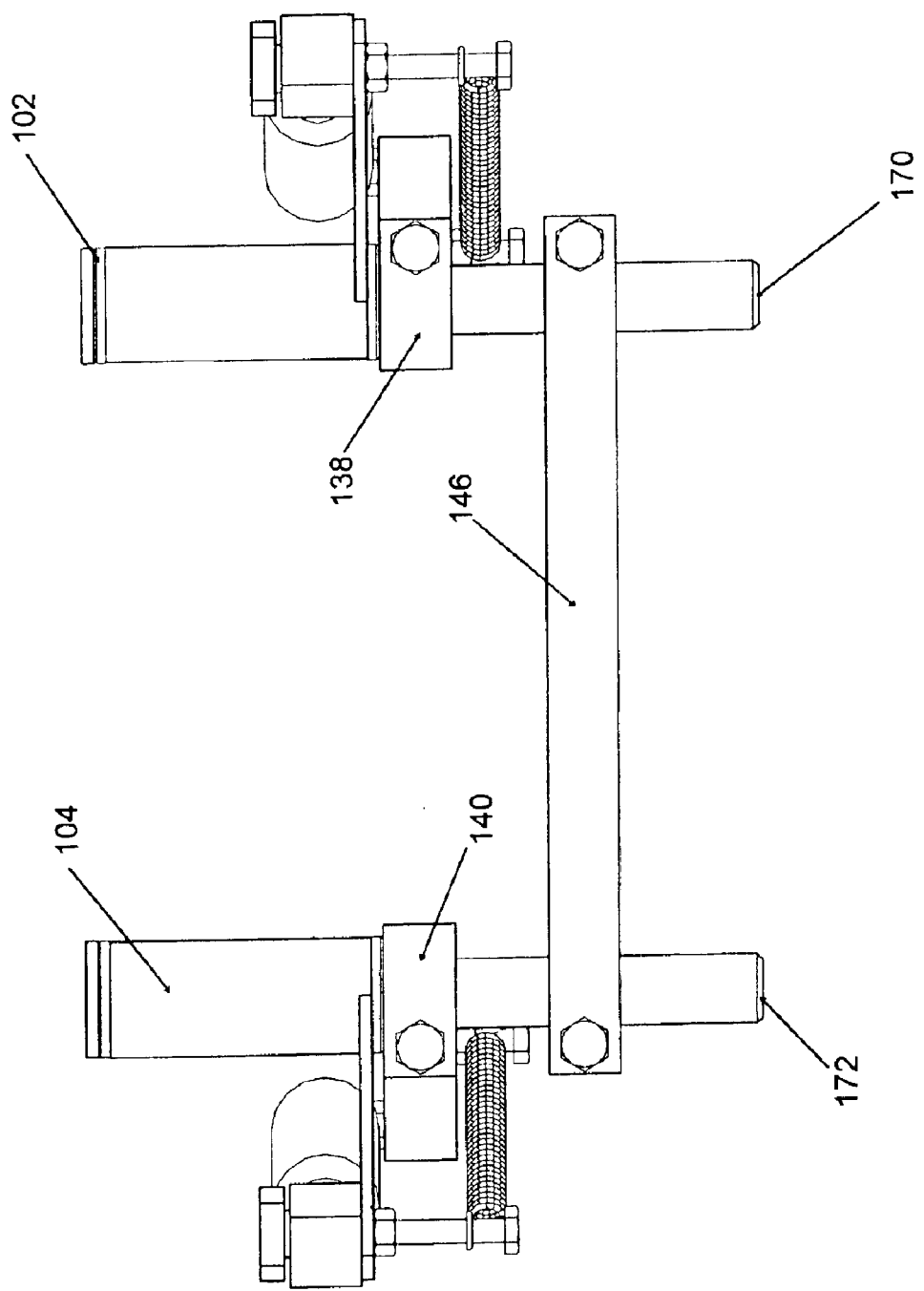
FIG. 19 provides a front view of an underscore assembly.

Referring to FIG. 19 a front view of the underscore assembly is shown. The front view shows the pivot mounts 102 and 104 as having pivot pins 170 and 172 extending downward from the pivot mount and acting as a mounting member to the base mount 146 and the cylinder mounts 138 and 140.

Figure 20:
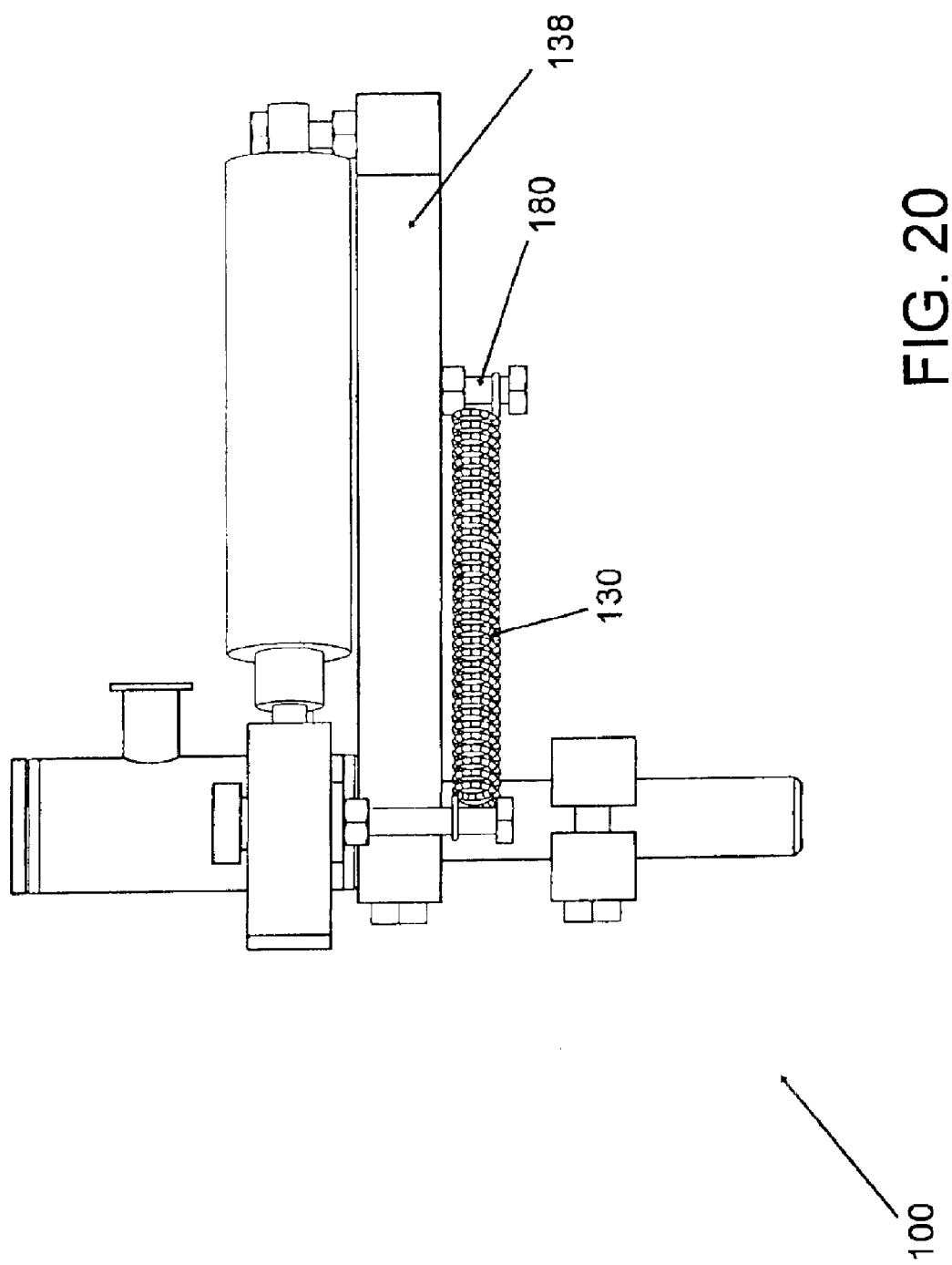
FIG. 20 provides a side view of an underscore assembly.

Referring to FIG. 20 a side view of the underscore assembly 100 is shown. The side view reveals the bias springs 130 also connected on its opposing end to the cylinder mount 138 by a downward extending pin 180.

The underscore blade can be controllably retracted by actuating cylinders 134 and 136 as the partial carcass approaches the blades and then released at the appropriate time to engage the knife in the leading edge of the tender, by allowing the biasing spring to release its potential.

Figure 3:
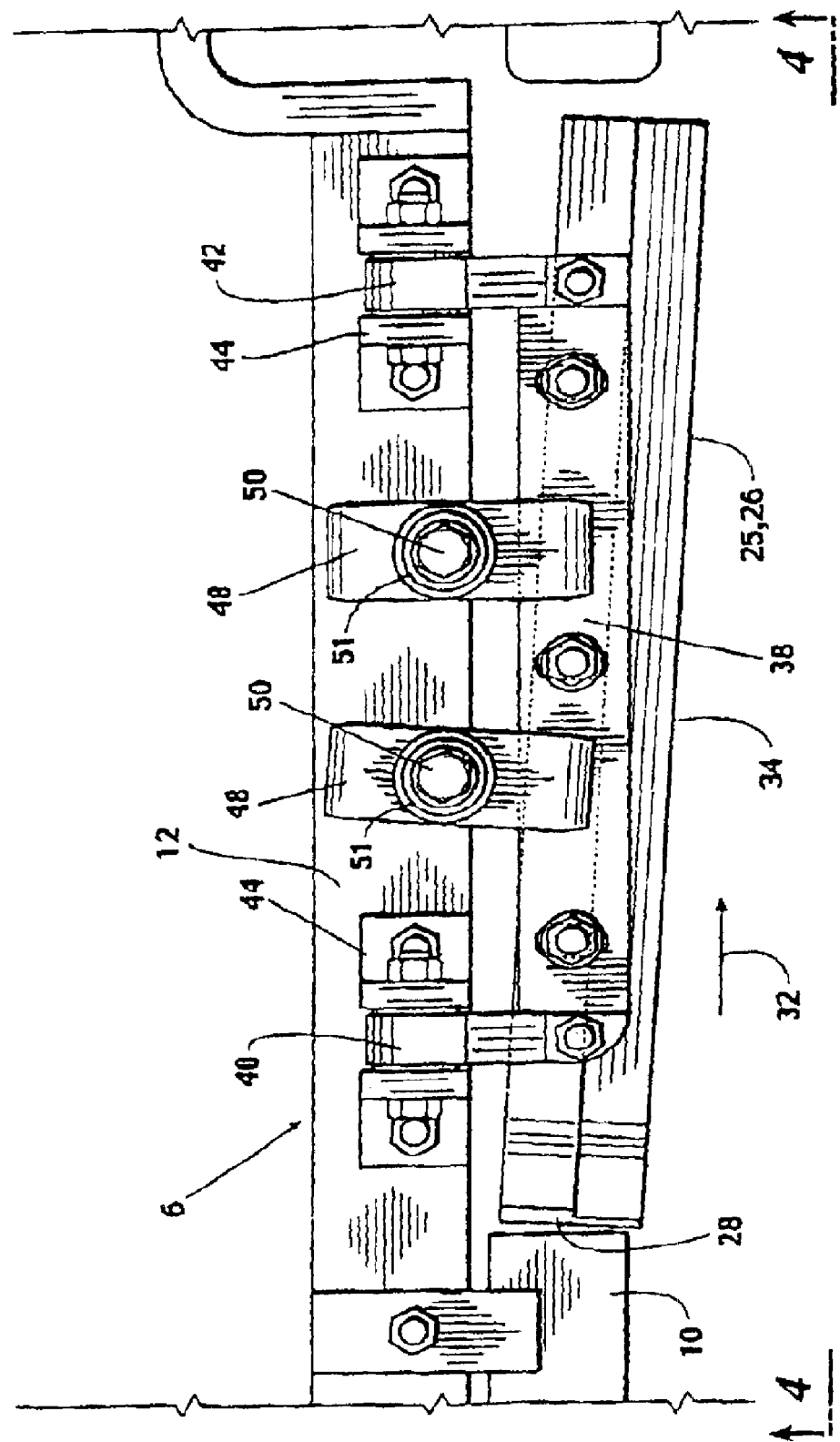
FIG. 3 provides an elevational side view of an elongate knife assembly 6 included in inventive apparatus 2.
Figure 4:
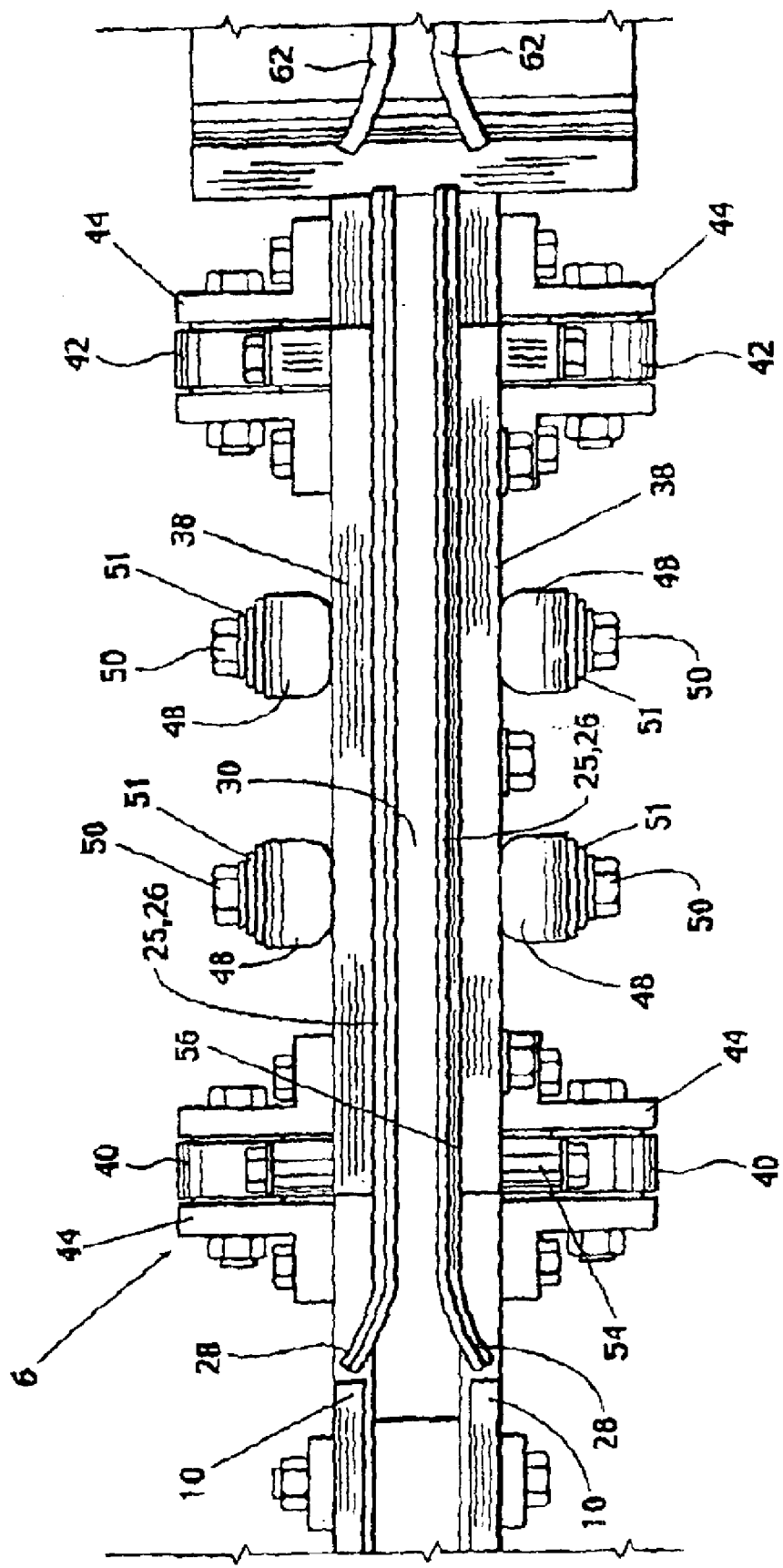
FIG. 4 provides a bottom view of elongate knife assembly 6.
Figure 5:
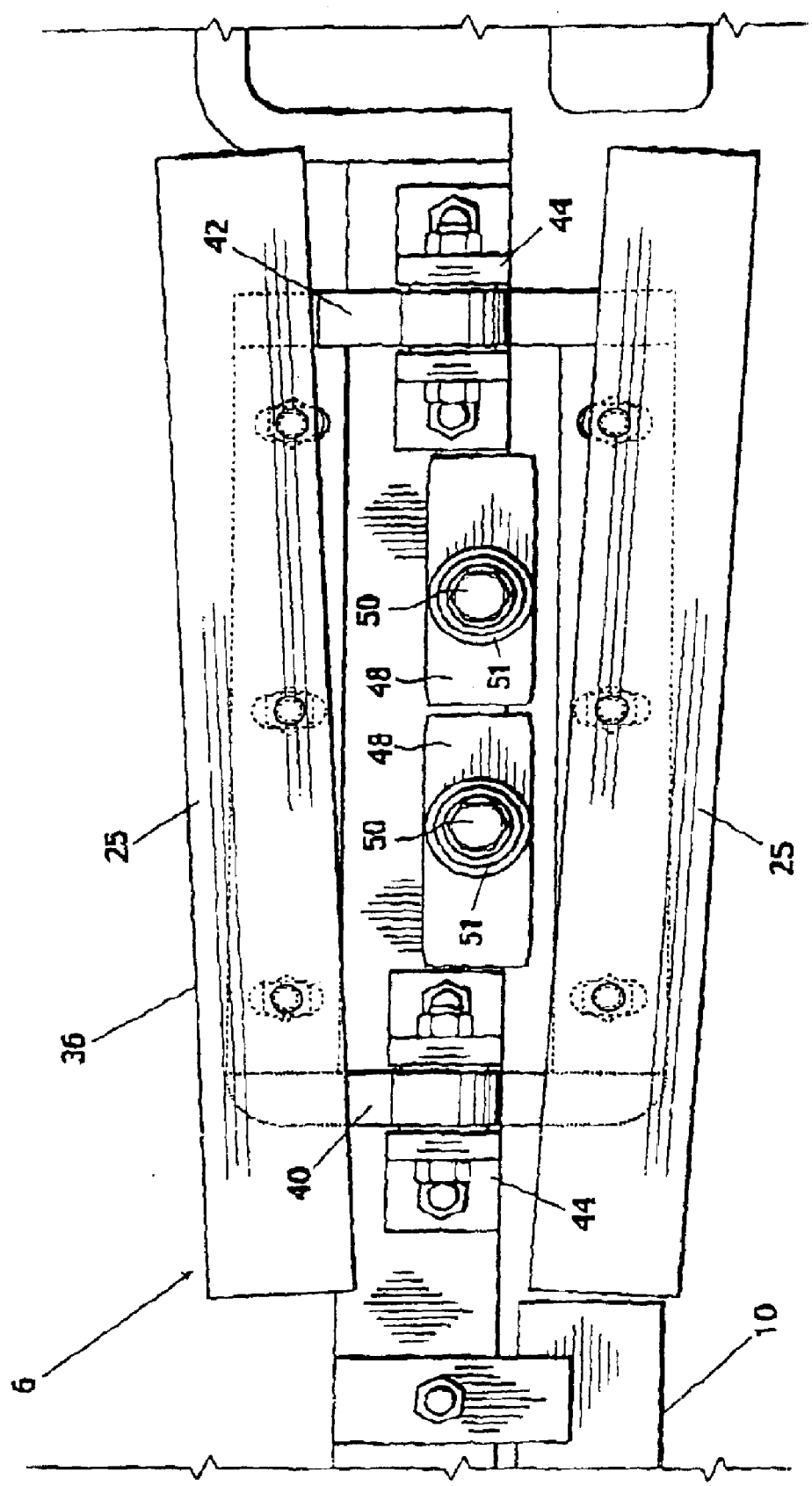
FIG. 5 provides an elevational side view of elongate knife assembly 6 in a maintenance position.

As shown in FIGS. 3–5, the elongate knife assembly 6 employed in embodiment 2 of the inventive apparatus most preferably trails entry guides 10 and comprises an opposing pair of blades 25 having: elongate lower blade edges 26; outwardly angled forward ends 28; and a gap 30 provided between blade edges 26. The outwardly angled forward ends 28 of blades 25 receive the keels of the poultry fronts from entry guides 10 and direct the keels into the gap 30 of elongate knife assembly 6. The outward angle of each of blades 25 is preferably about 10°. The gap 30 between elongate blade edges 26 is in line with the entry guide gap 22 and is sized such that elongate blade edges 26 will cut the fronts along each side of the keel while also guiding the fronts to the next stage of the inventive apparatus.

To provide an optimum pre-cut, the elongate blade edges 26 of knife assembly 6 are preferably inclined downwardly along the path of travel 32 of the fronts at an angle. Preferably, the range of the angle is from about 5° to about 20° from horizontal. The angle of inclination of elongate blade edges 26 will most preferably be about 10° from horizontal.

Although the angle of elongate lower edges 26 of blades 25 has been described in terms of the degree of inclination from horizontal, it will be understood by those skilled in the art that, should inventive apparatus 2 be employed in a system wherein the path of travel of the fronts through the inventive apparatus is other than horizontal, the orientation of blade edges 26 will be adapted to accommodate the actual flow path. Thus, the orientation of elongate blade edges 26 will preferably be adapted to maintain an angle of inclination, into the actual flow path, in the range of from about 5° to about 20°, more preferably not more than 20° and most preferably about 10°. Also, the preferred angle of the blade may vary depending on the applications which are within the scope of use of the present invention.

Each of the blades 25 employed in elongate knife assembly 6 is preferably mounted in a manner so as to be movable between a lowered operating position 34 as depicted in FIG. 3 and a raised maintenance position 36 as depicted in FIG. 5. The raised maintenance position 36 is particularly convenient for cleaning and sharpening the blades. To allow the blades 25 to be selectively raised and lowered in this manner and locked in their lower operating positions, each of blades 25 is preferably attached to main frame 12 by an assembly comprising: an elongate, horizontal bracing bar 38 to which the elongate upper portion of the blade 25 is attached; a forward pivot arm 40 attached to and extending upwardly from the forward end of bracing bar 38; a rear pivot arm 42 attached to and extending upwardly from the trailing end of bracing bar 40; a pair of brackets 44 secured to main frame 12 for pivotably retaining the upper ends of pivot arms 40 and 42 using bolts, pins, rods, or similar structures; and a pair of holding clamps 48 secured on main frame 12.

Clamps 48 are rotatably secured on main frame 12 by bolts 50 and springs 51. Thus, when it is desired to lock the blade 25 in its lowered operating position 34, clamps 48 can be conveniently turned by hand to their lowered positions depicted in FIG. 3. On the other hand, when it is desired to unlock the blade 25 and pivot the blade outwardly to its raised maintenance position 36, the clamps 48 can be rotated to the release position depicted in FIG. 5.

Figure 6:
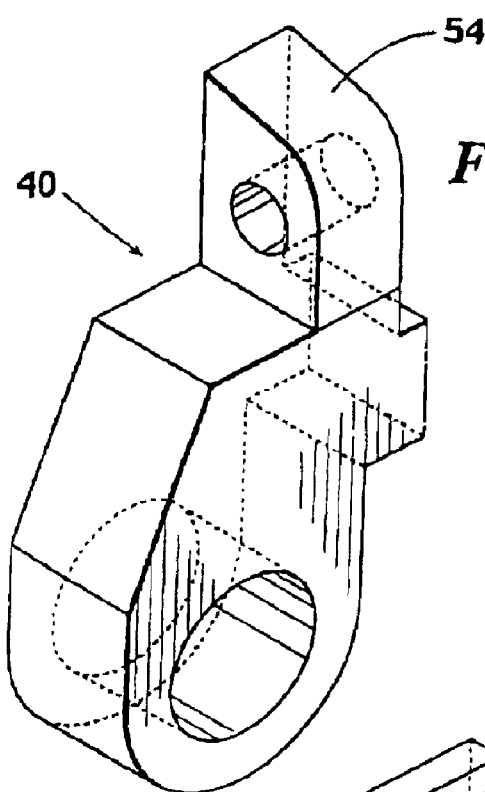
FIG. 6 provides a perspective view of a forward pivot arm 40 employed in elongate knife assembly 6.
Figure 10:
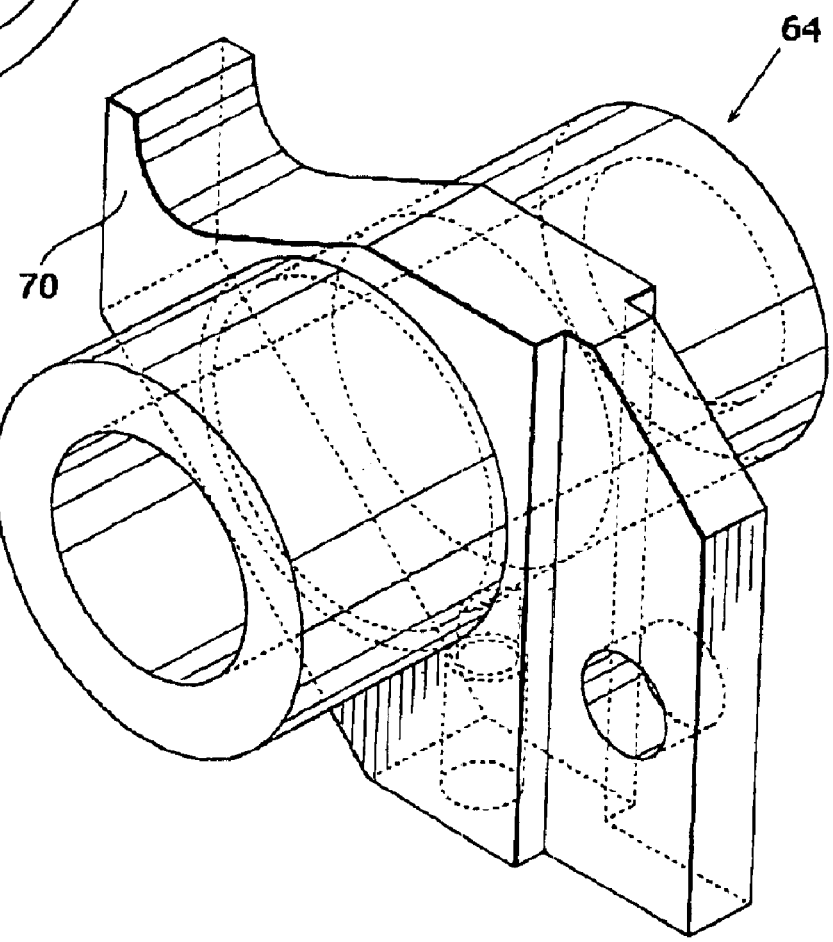
FIG. 10 provides a perspective view of a rotatable, blade mounting structure 64 employed in pivoting knife assembly 58.

To accommodate the travel of the poultry fronts through elongate knife assembly 6 and prevent the fronts from becoming snagged or damaged by protruding edges, the lower ends 54 of forward pivot arms 40 will preferably be curved or rounded as depicted in FIG. 6. In like manner, the forward ends of bracing bars 38 will preferably be curved or rounded to match the curvature of the lower ends 54 of the forward pivot arms 40.

Figure 7:
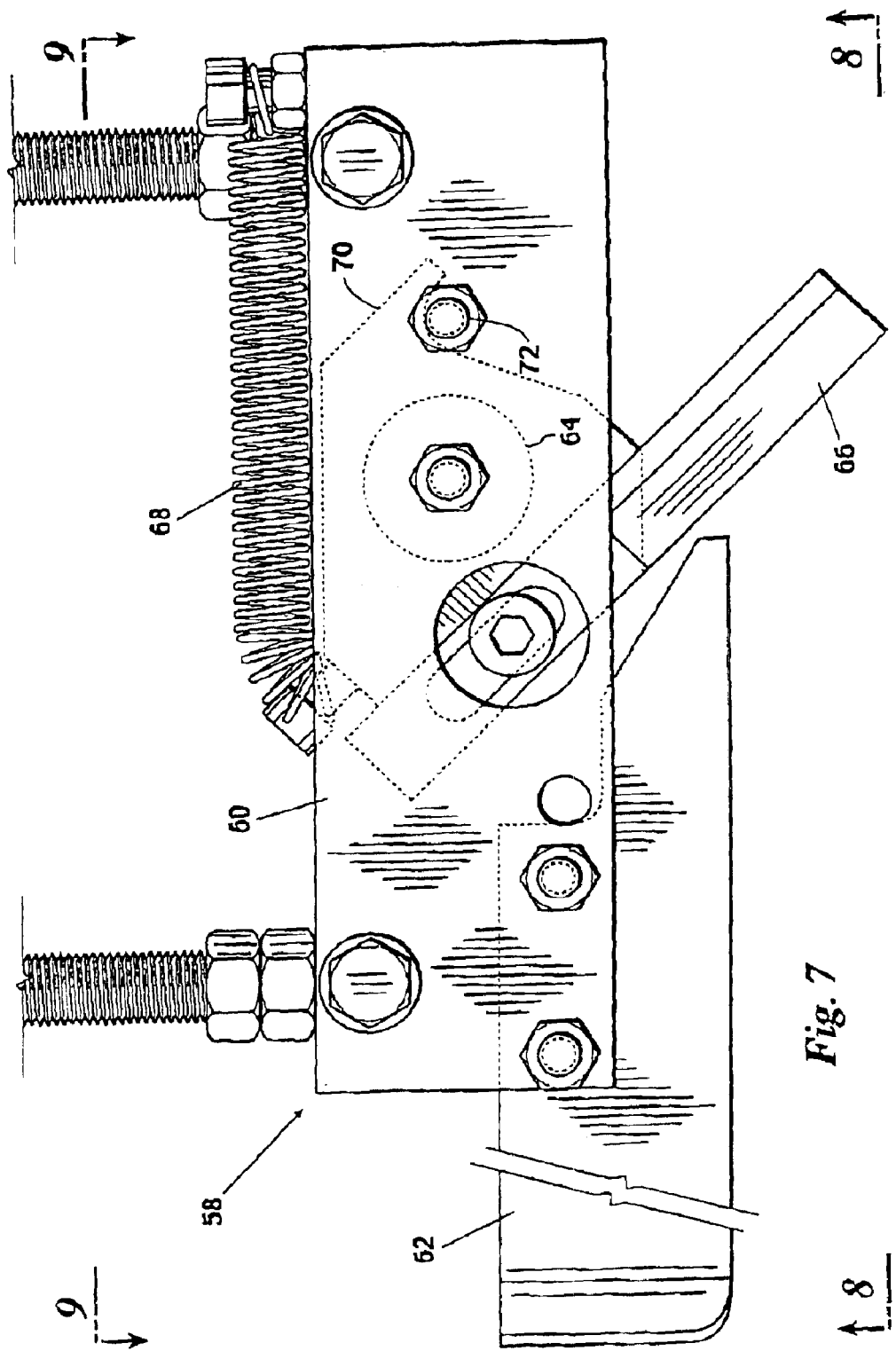
FIG. 7 provides an elevational side view of an embodiment 58 of a pivoting knife assembly employed in inventive apparatus 2.
Figure 8:
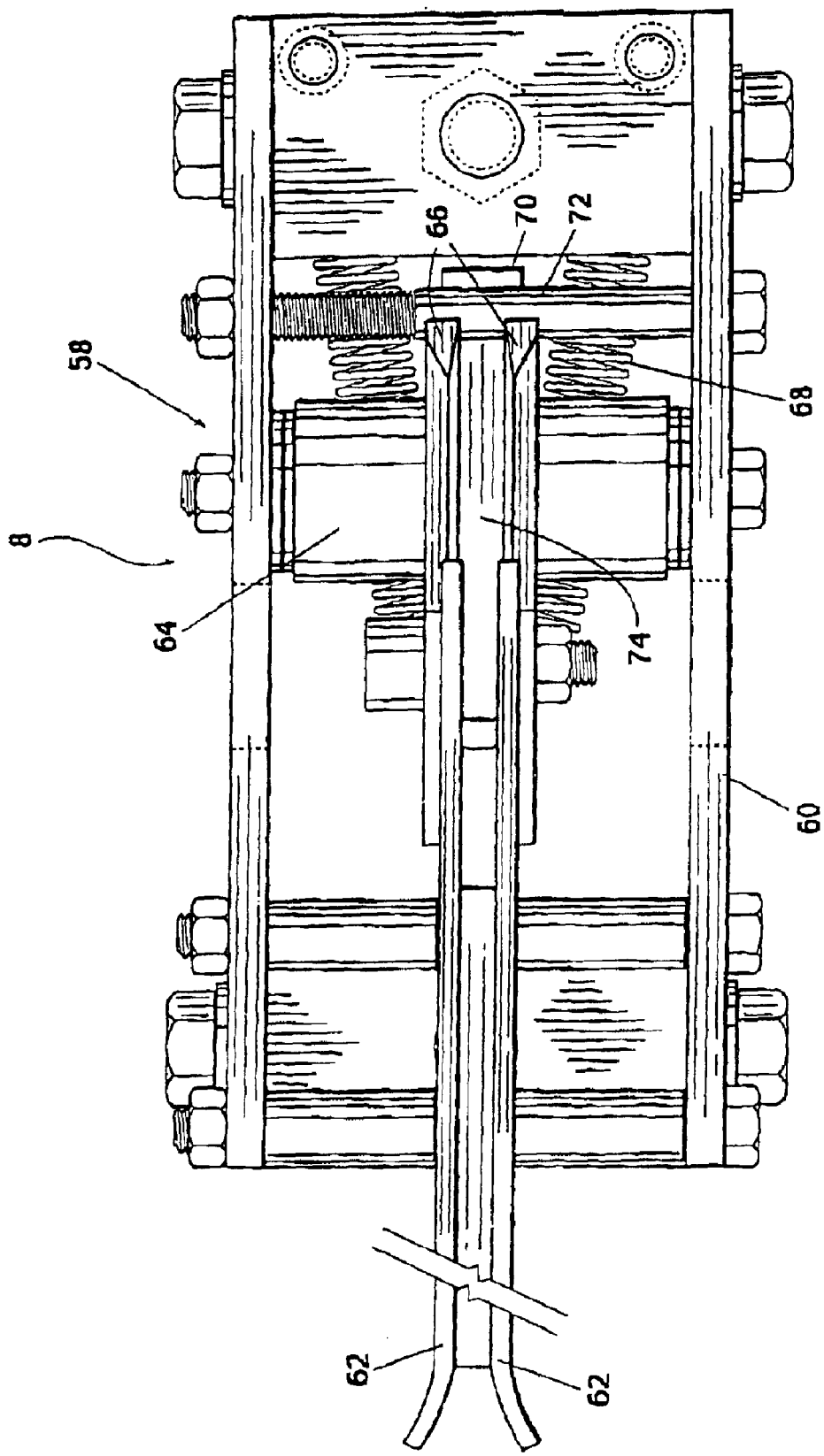
FIG. 8 provides a bottom view of pivoting knife assembly 58.
Figure 9:
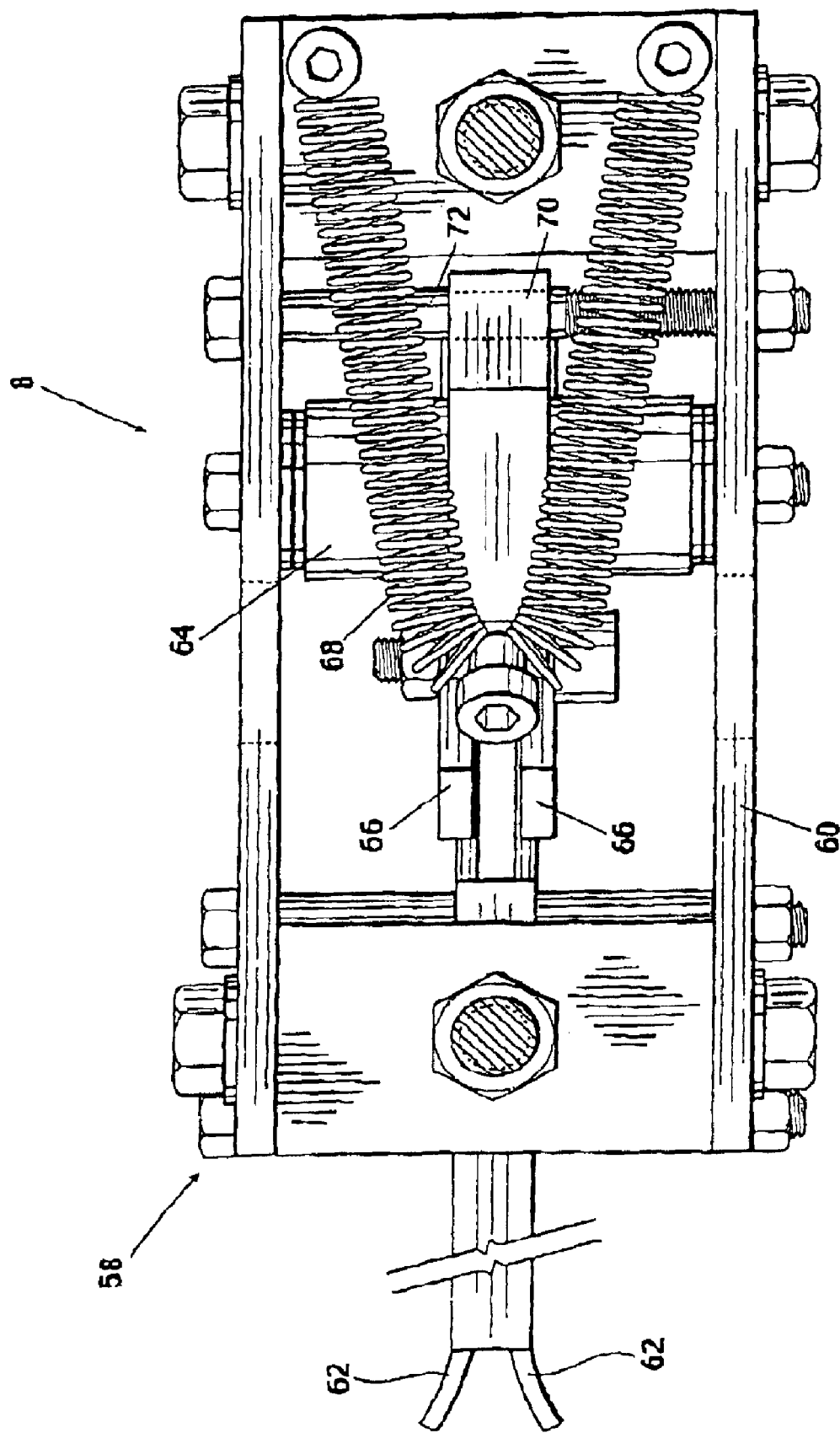
FIG. 9 provides a plan view of pivoting knife assembly 58.

The pivoting knife assembly 8 employed in inventive apparatus 2 can be a spring-loaded assembly 58 of a type heretofore employed upstream of some plow assemblies for finishing the cutting operation. As depicted in FIGS. 7–9, the pivoting knife assembly 58 preferably comprises: a housing 60; a pair of keel guides 62 secured in and projecting from the forward end of housing 60; a blade mounting structure 64 rotatably secured within housing 60; and a pair of blades 66 removably secured to and extending from mounting structure 64 such that the blades 66 project from the bottom of housing 60. The pivoting knife assembly 58 further comprises a biasing spring 68 secured between the top of housing 60 and the upper portion of blade mounting structure 64 for automatically moving blades 66 to (i.e., biasing blades 66 toward) a downwardly pivoted position as depicted in FIG. 7. The downwardly pivoted or canted position of blades 66 depicted in FIG. 7 will preferably be in the range of from about 45° to about 60° from horizontal (or from the path of travel of the fronts if other than horizontal). The blades 66 are prevented from pivoting further downward by a stop arm 70 which extends from the rotatable blade mounting structure 64 and engages a stop rod or similar structure 72 secured in housing 60.

The orientation of pivoting blades 66 and the gap 74 provided therebetween are preferably such that blades 66 will follow along the cut lines formed by elongate knife assembly 6. The pivoting blades 65 thus continue the pre-cutting operating by cutting deeper into the carcasses along the keels. However, the pivoting nature of the blades 66 coupled with the biasing force provided by spring 68 allows the blades 66 to pivot upwardly to cut effectively while adapting to and accommodating the contours and variations in size and shape of the fronts.

The blades 66 of pivoting knife assembly 58 are secured to a common mounting structure 64 such that blades 66 will always pivot in unison.

Figure 11:
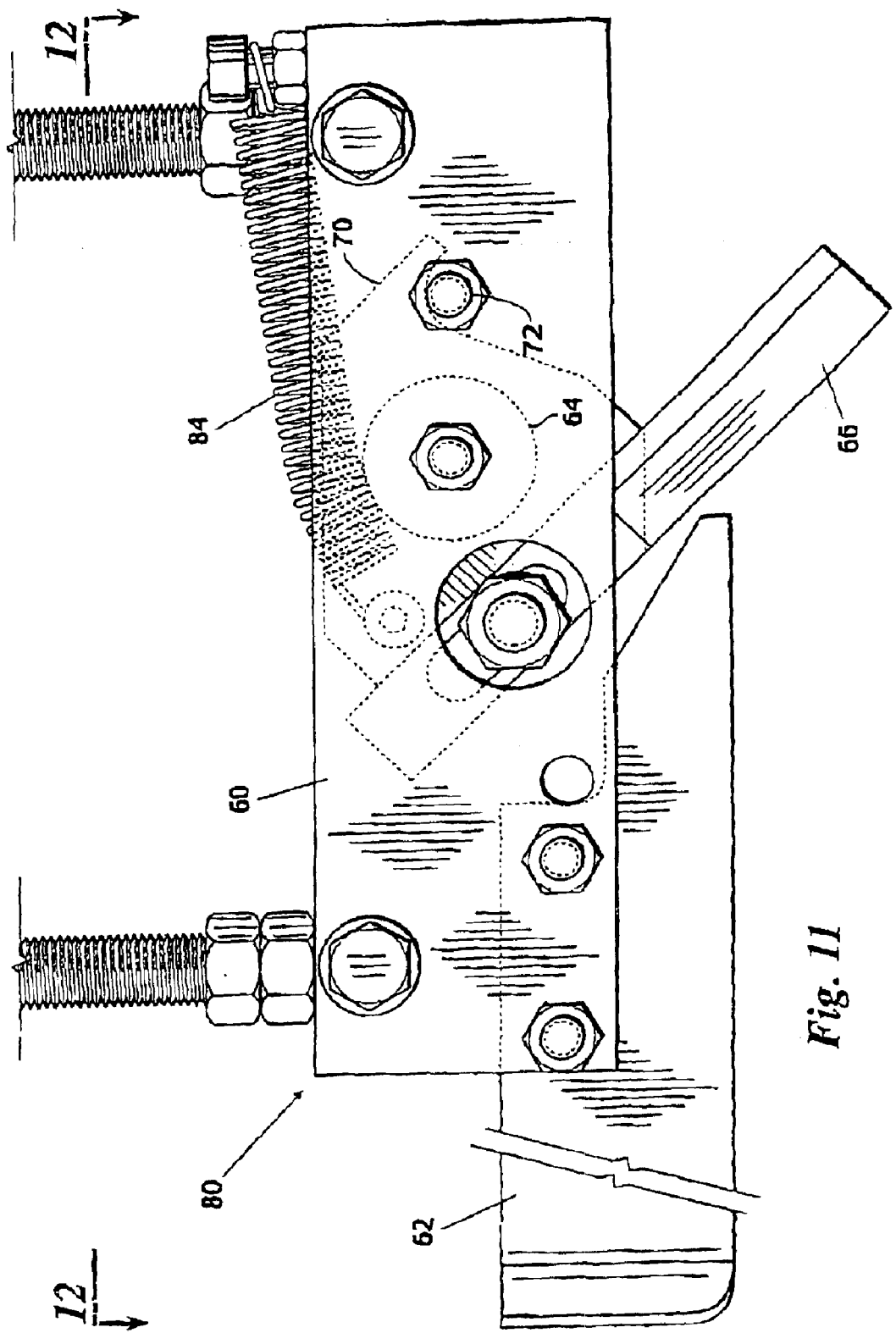
FIG. 11 provides an elevational side view of an alternative, preferred embodiment 80 of the pivoting knife assembly.
Figure 12:
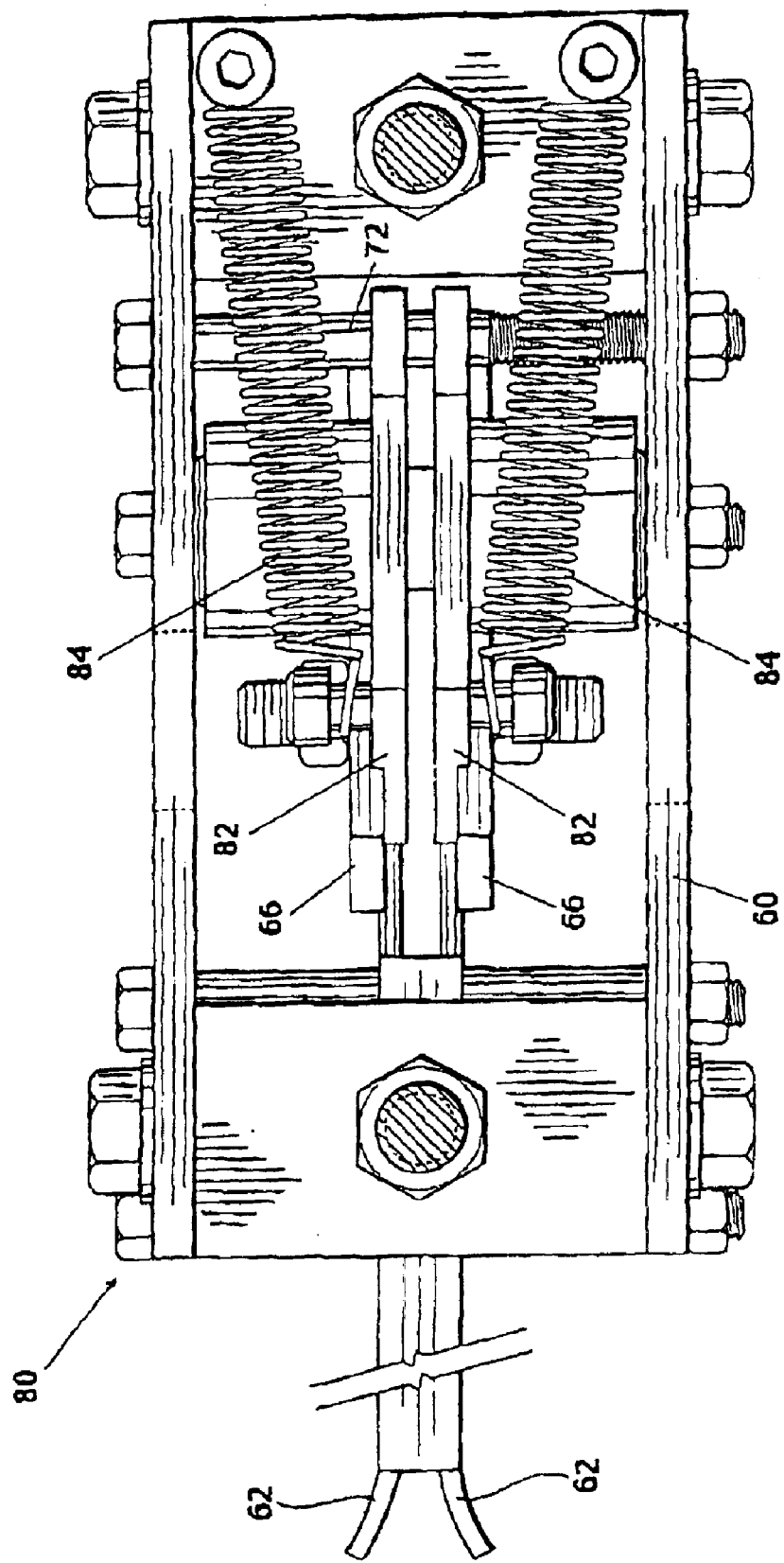
FIG. 12 provides an upper view of the alternative, preferred pivoting knife assembly 80.
Figure 14:
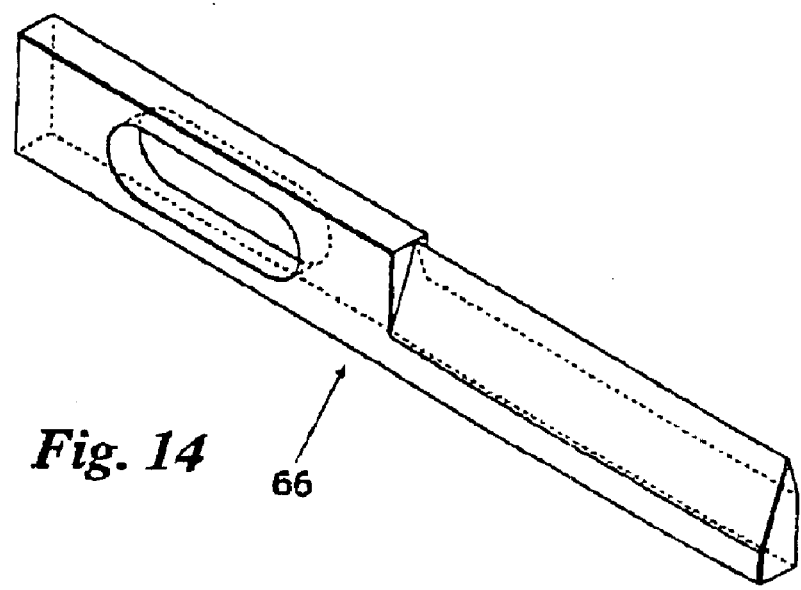
FIG. 14 provides a perspective view of a blade 66 employed in pivoting knife assemblies 58 and 80.
Figure 13:
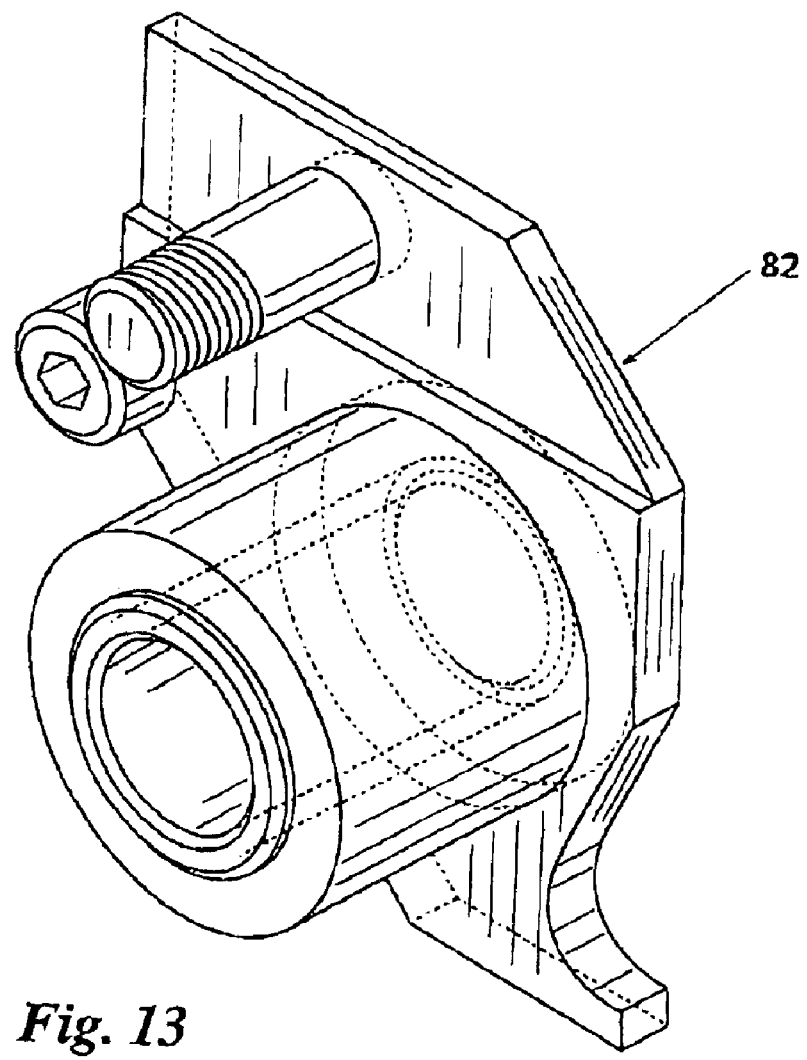
FIG. 13 provides a perspective view of a rotatable, blade mounting structure 82 employed in the alternative, preferred pivoting knife assembly 80.

A more preferred embodiment 80 of the pivoting knife assembly 8 employed in inventive apparatus 2 is depicted in FIGS. 11–13. The preferred pivoting knife assembly 80 is substantially identical to knife assembly 58 except that, in preferred assembly 80, the blades 66 are mounted for independent pivoting movement. In embodiment 80, blades 66 are secured to separate, independently rotatable mounting structures 82 having separate biasing springs 84 attached thereto.

In operation, a cone-type conveyor or similar device will preferably be used to deliver the poultry fronts into and beneath inventive apparatus 2 such that the exposed tenders, typically with the membrane covering still attached, are facing upwardly and the shoulder and neck portions of the fronts are facing forwardly in the direction of travel. Upon entering inventive apparatus 2, the wings and the outer (non-tender) portions of the breasts will preferably have already been removed.

As the fronts are guided through elongate knife assembly 6, the elongate blades 25 thereof are preferably oriented and positioned to (a) cut the wishbone on each side of the keel, (b) contact the head of the tender at the neck area of the front, (c) cut through at least the upper portion of the tender membrane, and (d) begin separating the tender meat from the front by cutting along the keel.

In one aspect, the pivoting knife assembly 58 operates as a backup to the elongate knife assembly 6 in order to sever any wishbones missed by the elongate knife. In addition, the pivoting blades 66 will preferably be oriented and positioned to cut the portion of the tender membrane covering the head of the tender at the neck area of the front. The pivoting blades are capable of cutting the membrane in the neck cavity so that the tenders can be removed without tearing the head of the tender. The pivoting blades 66 also preferably cut more deeply into the fronts to thus continue the process begun by the elongate blades 25 of cutting the tenders away from the keels.

In an alternative embodiment the tender is also underscored prior to being conveyed past the elongate knife. The tenders can be underscored along the length of the entry guides or between the entry guides and the elongate knife. The tenders can be underscored by the underscore blades as described above prior to cutting with the elongate knife.

Finally, as the fronts travel through the plow assembly 4, the forward circular plows/blades 18 sever any membranes missed by the previous devices and complete the tender cutting operation. The trailing plows 20 follow in the path created, by the various cutting devices and operate to pull the tenders away from the fronts. After plows 20, sufficient separation of the tenders from the fronts will have been achieved to allow the tenders to be easily pulled from the fronts by hand or by using known mechanical devices.

Thus, the present invention is well adapted to carry out the objects and attain the ends and advantages mentioned above as well as those inherent therein. While presently preferred embodiments have been described for purposes of this disclosure, numerous changes and modifications will be apparent to those skilled in the art. Such changes and modifications are encompassed within the spirit of this invention as defined by the appended claims.

What is claimed is:

1. An apparatus for removing breast tenders from a partial carcass comprising:

an elongated frame mountable above a conveyor conveying partial carcasses having a plow assembly having at least one pair of opposing proximately spaced rotating circular plows attached thereto and an elongated entry guide attached thereto upstream relative to a path of conveyance of said plow assembly and said guide having proximately spaced side by side rails for receiving and aligning a keel of a partial carcass having a tender exposed; and an underscore blade assembly having a pair of proximately spaced horizontally oriented underscore blades attached to the frame along the length of the entry guide and said blades positioned to laterally underscore the tender and said underscore assembly attached upstream of the plow assembly.

2. The apparatus for removing breast tenders as recited in claim 1, where the elongated entry guide has a sharpened lower edge.

3. The apparatus for removing breast tenders as recited in claim 1, where the underscore blade assembly further comprises:

a pair of rotatable spring biased pivot mounts where each pivot mount has one of the pair of underscore blades mounted thereto and where the bias of a biasing spring urges the pair of blades inward toward one another;

a pair of controllably actuateable cylinders where each cylinder has one of the pair of underscore blades operably attached thereto by the pivot mounts and where the cylinder is operable to rotate the blade outward to a retracted position and further operable to release the blade to allow the spring to urge the blades inward to engage an oncoming tender.

4. An apparatus for removing breast tenders from partial carcasses comprising:

an elongated frame mountable above a conveyor conveying partial carcasses having a plow assembly having at least one pair of opposing rotatable circular plows attached thereto;

an underscore blade assembly attached to the frame upstream of plow assembly relative to direction of conveyance of an oncoming partial carcass further comprising:

a pivot mount having an underscore blade horizontally extending therefrom;

a biasing spring attached to pivot mount and operable to effect inward rotation of the underscore blade to engage a partial carcass being conveyed; and a cylinder operably attached to the pivot mount and operable to effect rotation of the pivot mount to retract and release the underscore blade.

5. The apparatus for removing breast tenders as recited in claim 4, where the at least one pair of plows each have sharpened edges.

6. The apparatus for removing breast tenders as recited in claim 4 further comprises:

an elongated knife assembly attached to said frame having a pair of proximately spaced elongated blades with sharpened lower edges for making a vertically downward cut; and a pivoting knife assembly attached to said frame having a pair of proximately spaced independently spring loaded elongated pivotable blades where each blade is urged by a separate biasing spring to pivot about one end of the pivotable blades rotating an opposing end of the pivotable blades to pivotably cant downward.

7. An apparatus for removing breast tenders from partial carcasses comprising:

an elongated frame mountable over a conveyor conveying partial carcasses; and an underscore blade assembly attached to the underside of said frame having a pair of proximately spaced horizontally oriented underscore blades and positioned for laterally underscoring a tender as it is conveyed past the blades with the horizontally oriented blades;

where said underscore blade assembly further comprises, a pivot mount having an underscore blade horizontally extending therefrom;

a biasing spring attached to the pivot mount and operable to effect inward lateral rotation of the underscore blade to engage a partial carcass being conveyed; and a cylinder operably attached to the pivot mount and operable to effect rotation of the pivot mount to retract and release the underscore blade.

8. The apparatus for removing breast tenders as recited in claim 7 further comprises:

an elongated knife assembly attached to said frame having a pair of proximately spaced elongated blades with sharpened lower edges for making a vertically downward cut; and a pivoting knife assembly attached to said frame having a pair of proximately spaced independently spring loaded elongated pivotable blades where each blade is urged by a biasing spring to pivot about one end of the pivotable blades rotating an opposing end of the pivotable blades to pivotably cant downward.

9. In an apparatus for removing poultry breast tenders from at least partial poultry carcasses, said at least partial poultry carcasses including at least partial keels and said apparatus having at least a pair of rotatable plows positioned to be on opposite sides of said keels as said at least partial poultry carcasses are conducted in a path of travel through said apparatus, the improvement comprising a pair of blades having elongate blade edges and having an operating position upstream of said plows wherein said elongate blade edges are fixed in a stationary, opposing, spaced apart orientation effective for receiving said keels therebetween and guiding said at least partial poultry carcasses along said path of travel while cutting into said at least partial poultry carcasses along each side of said keels.

10. The apparatus of claim 9 wherein said stationary, opposing, spaced apart orientation of said elongate blade edges is effective for cutting wishbones included in said at least partial poultry carcasses.

11. The apparatus of claim 9 wherein said stationary, opposing, spaced apart orientation of said elongate blade edges is effective for at least partially cutting tender membranes included in said at least partial poultry carcasses.

12. The apparatus of claim 9 wherein said stationary, opposing, spaced apart orientation of said elongate blade edges is effective for at least partially cutting said poultry breast tenders from said at least partial poultry carcasses along said keels.

13. The apparatus of claim 9 wherein, in said stationary, opposing, spaced apart orientation, said elongate blade edges are downwardly inclined in said path of travel at an angle in the range of from about 5° to about 20° from horizontal.

14. The apparatus of claim 9 wherein said blades have leading end portions which are outwardly angled.

15. The apparatus of claim 9 wherein each of said blades is movable between said operating position and a raised maintenance position.

16. The apparatus of claim 9 wherein the improvement further comprises an opposing second pair of blades pivotably positioned between said elongate blade edges and said plows in a manner effective for further separating said poultry breast tenders from said at least partial poultry carcasses and for pivoting upward as said at least partial poultry carcasses are conducted therethrough.

17. The apparatus of claim 16 wherein said opposing second pair of blades are attached for pivoting upwardly in an independent manner as said at least partial poultry carcasses are conducted therethrough.

18. The apparatus of claim 16 wherein said second pair of blades are oriented in a manner effective for cutting said at least partial poultry carcasses at a depth beyond that reached by said elongate blade edges.

19. In an apparatus for removing poultry breast tenders from at least partial poultry carcasses, said at least partial poultry carcasses including at least partial keels and said apparatus having at least a pair of rotatable plows positioned to be on opposite sides of said keels as said at least partial poultry carcasses are conducted in a path of travel through said apparatus, the improvement comprising a pair of blades having elongate blade edges and having an operating position upstream of said plows wherein said elongate blade edges are spaced apart and are inclined into said path of travel at an angle in the range of from about 5° to about 20°.

20. The apparatus of claim 19 wherein said operating position is effective for cutting, on each side of said keels, wishbones included in said at least partial poultry carcasses.

21. The apparatus of claim 19 wherein said operating position is effective for at least partially cutting tender membranes included in said at least partial poultry carcasses.

22. The apparatus of claim 19 wherein said operating position is effective for at least partially cutting said poultry breast tenders from said at least partial poultry carcasses along said keels.

23. The apparatus of claim 19 wherein said blades have leading end portions which are outwardly angled.

24. The apparatus of claim 19 wherein each of said blades is movable between said operating position and a raised maintenance position.

25. The apparatus of claim 19 wherein the improvement further comprises an opposing second pair of blades pivotably positioned between said elongate blade edges and said plows in a manner effective for further separating said poultry breast tenders from said at least partial poultry carcasses and for pivoting upwardly as said at least partial poultry carcasses are conducted therethrough.

26. The apparatus of claim 25 wherein said opposing second pair of blades are attached for pivoting upwardly in an independent manner as said at least partial poultry carcasses are conducted therethrough.

27. The apparatus of claim 19 wherein said second pair of blades are oriented in a manner effective for cutting said at least partial poultry carcasses at a depth beyond that reached by said elongate blade edges.

28. In a method for removing poultry breast tenders including the step of plowing said poultry breast tenders by conducting at least partial poultry carcasses having said poultry breast tenders thereon, and having at least partial keels, in a path of travel through at least a pair of rotatable plows positioned on opposite sides of said keels, the improvement comprising the step, prior to said step of plowing, of precutting said at least partial poultry carcasses by conducting said at least partial poultry carcasses through a pair of stationary blades having elongate blade edges spaced apart and inclined into said path of travel at an angle of not more than 20° such that said blade edges receive said keels therebetween and guide said at least partial poultry carcasses in said path of travel while cutting into said at least partial poultry carcasses along each side of said keels.

29. The method of claim 28 wherein, in said step of precutting, wishbones included in said at least partial poultry carcasses are cut on each side of said keels by said elongate blade edges.

30. The method of claim 28 wherein, in said step of precutting, tender membranes included in said at least partial poultry carcasses are cut on each side of said keels by said elongate blade edges.

31. The method of claim 28 wherein, in said step of precutting, said poultry breast tenders are at least partially cut from said at least partial poultry carcasses by said elongate blade edges along said keels.

* * * * *